United States Patent [19]
Bastgen

[11] 4,019,431
[45] Apr. 26, 1977

[54] METHOD OF DEWATERING SLUDGE
[75] Inventor: Wendel Bastgen, Betzdorf, Sieg, Germany
[73] Assignee: Alb. Klein KG, Niederfischbach, Germany
[22] Filed: June 7, 1974
[21] Appl. No.: 477,413
[30] Foreign Application Priority Data
  June 13, 1973  Germany ............. 2330029
  Mar. 17, 1973  Germany ............. 233368
[52] U.S. Cl. ............ 100/37; 100/118; 100/153; 210/384; 210/386
[51] Int. Cl.² ............ B30B 9/24
[58] Field of Search ............ 100/118–120, 100/151–154, 37; 210/400, 401, 384, 386, 388, 77

[56] References Cited
UNITED STATES PATENTS

| | | | |
|---|---|---|---|
| 2,116,168 | 5/1938 | Fish et al. | 210/384 X |
| 2,910,185 | 10/1959 | Wehner | 210/384 X |
| 3,315,370 | 4/1967 | Hikosaka | 100/118 X |
| 3,459,123 | 8/1969 | Begiebing | 100/118 |
| 3,743,100 | 7/1973 | Bahr | 210/401 |
| 3,906,853 | 9/1975 | Wohlfarter | 100/118 |

Primary Examiner—Peter Feldman
Attorney, Agent, or Firm—Hane, Baxley & Spiecens

[57] ABSTRACT

There is disclosed a method of dewatering sludge such as residuals in sewage discharge processing installations. The method provides that cakes are formed of the sludge. These cakes have initially a high water content and are of inhomogenous, loose consistency. They are guided between filter bands through a preliminary filtering zone in which some of the water contained in the cakes is extracted by straining and pressure action applied thereto. The filter bands with the cakes therebetween are then successively guided over a first dewatering drum and a subsequent second dewatering drum. Pressure is applied to the filter band while being guided about the drums, thereby extracting further water from the cakes. Additionally, the cakes while traveling from the feed-in point toward and through pressure zones are deformed and also turned over thereby compacting the cakes as water is extracted therefrom. Finally, the cakes after being sufficiently dewatered and compressed are discharged.

8 Claims, 6 Drawing Figures

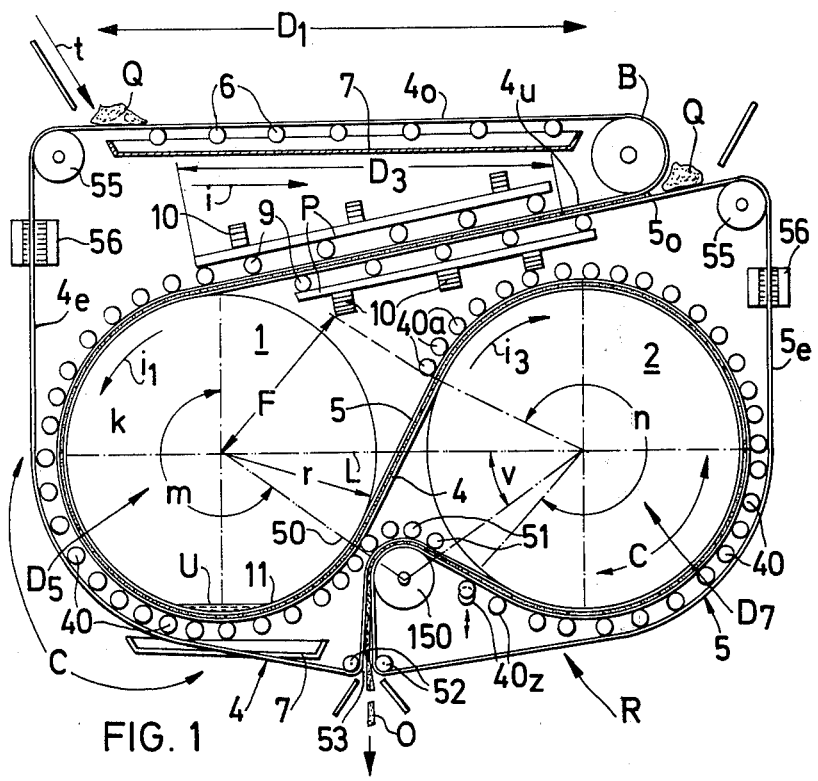
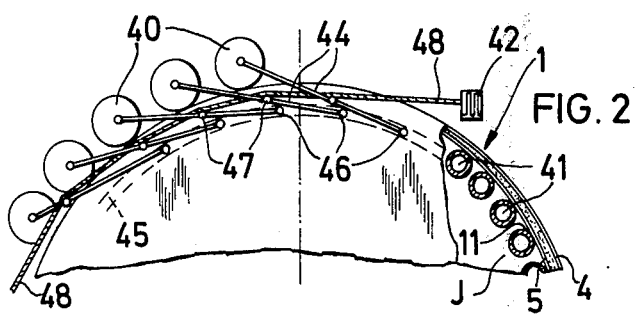
FIG. 1
FIG. 2

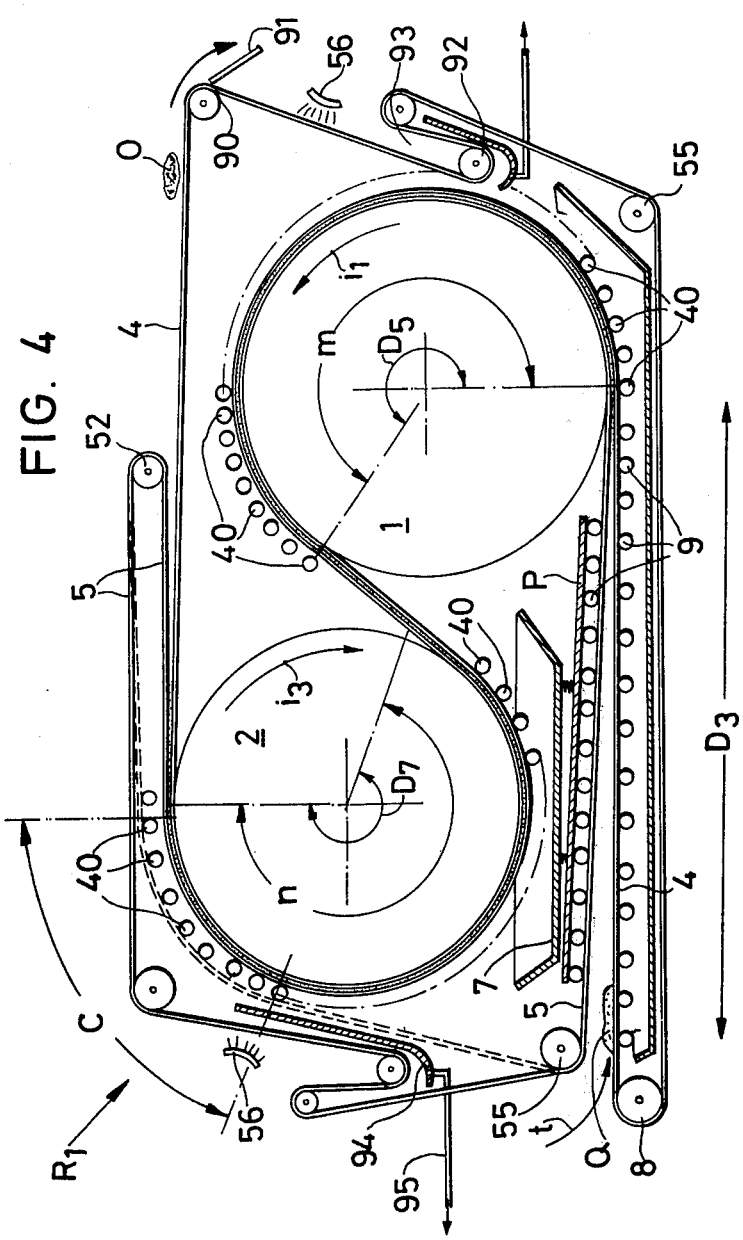

METHOD OF DEWATERING SLUDGE

The invention relates to a method of dewatering sludge-type material as it is produced as a by-product or residual product in sewage discharge processing or similar installations.

BACKGROUND

There are known devices for dewatering sludge of the general type above referred to in which cakes formed of sludge to be processed are guided between two filter bands about the circumferential wall of a drum. As a result, a certain percentage of the water contained in the cakes is removed as the cakes are guided about the drum.

A method using this mode of dewatering sludge and also a device for carrying out the method is described, for instance, in German DTAS No. 1,960,787. This patent describes a dewatering press in which filter bands are guided partly about the circumference of a single drum, the sludge to be processed being carried between two filter bands. It has been found that such an arrangement does not result in an economically acceptable dewatering efficiency.

There are also known devices for the purpose from U.S. Pat. No. 2,111,720 and German Pat. No. 689,090, in which guidance of filter bands used for causing dewatering of the sludge is similarly unfavorable with respect to efficiency.

Tests have shown that the shortcomings of dewatering devices as previously described are caused primarily by an insufficient break-up of the sludge during the dewatering operation itself.

THE INVENTION

It is a broad object of the invention to provide a novel and improved method of dewatering sludge and also a device for carrying out this method which eliminates the aforepointed out shortcomings of sludge dewatering methods and devices as heretofore known.

It is also an object of the invention to combine a high dewatering efficiency with minimal space requirements.

According to the invention, these advantages of high dewatering efficiency and minimal space requirements are obtained by increasing the active length of the filter bands in relation to the total length of the filter bands which, in all dewatering devices as heretofore known, was well below 50%. Modern demands with respect to the quality of processing sewage water discharges require much higher efficiency for environmental reasons coupled with economically acceptable costs.

SUMMARY OF THE INVENTION

The aforepointed out objects, features and advantages, and other objects, features and advantages which will be pointed out hereinafter are obtained by providing at least two drums as dewatering drums and guiding filter bands between which the sludge to be dewatered is carried, at least over part of the circumferential walls of these drums. In this connection it is advantageous to drive the two drums in opposite directions and to guide the filter bands over the circumferential walls of the drum so that they define a generally S-shaped configuration in upright position.

The circumferential walls of the drums may be made either of corrugated or perforated sheet metal such as steel, or they may be composed of tubes extending lengthwise of the axes of the drums. The latter arrangement assures that the filtrate as it is extracted from passing sludge will be discharged into the interior of the drums from which it can be conveniently removed.

Accordingly to an aspect of the invention, the dewatering drums define within the range of their circumferential walls about which the filter bands are guided several pressure zones within which an S-shaped guidance of the filter bands causes pulling, kneading and deforming action upon the generally cakeshaped sludge portions placed between the filter bands. As a result, the internal consistency of the cake is loosened thereby facilitating extraction of water therefrom.

In this connection, it may be mentioned that the concept of the invention is not limited to two drums, but in some instances it may be preferable to provide more than two drums in side-by-side arrangement and to guide the filter bands accordingly over the circumferential walls of the drums.

According to another aspect of the invention, sludge in the form of sludge cakes of inhomogenous consistency, after having been guided through one or more straining and/or preliminary dewatering zones ($n$) supported on a filter band, is guided to a further filter band while being simultaneously mixed, if desired, assisted by gravitational force. Thereupon the sludge cakes are guided between the two filter bands which are disposed in parallel relationship and preferably along a linear path through a preliminary pressure zone. At the end of this zone the sludge is guided over the first one of the afore-referred to dewatering drums. At the same time, the sludge cakes may be subjected to vibratory pressure and continuing shear forces. After having been subjected to the action of this composite force resulting in a thorough loosening of the sludge cakes, the filter bands and thus also the sludge cakes therebetwee are deflected after leaving the first dewatering drum into the opposite direction and then guided upon the second dewatering drum, that is, the sludge cakes are now subjected to a pressure zone curved in opposition to the curvature on the first drum since, as previously stated, the two drums being driven in opposite direction.

The aforereferred to pulsing or vibrating pressure is obtained by guiding the filter bands and thus also the sludge cakes between pressure rolls and the circumferential wall of the dewatering drum $1/n$. The just-described aspect of the invention may also provide that the pressure force applied to the sludge cakes via the filter bands, and more specifically by the outer filter band, is increasing in the driving direction of the bands.

According to the invention, it is also particularly advantageous that the envelopment angle of the filter bands on the drums which obviously controls the length of the pressure zones is larger than 180°. It is further advantageous that the pressure or planet rolls be provided at least along the circumferential range of the drum as determined by the aforementioned angle of more than 180°.

As it is evident, the longer the pressure zone is, the more intensive is the action of the shear forces upon the sludge cake as these shear forces are generated when and while the filter bands envelope the circumferential walls of the dewatering drums. Obviously, the outer filter band must travel a longer distance than the inner filter band as they are driven by the rotation of the drums. Accordingly, assuming equal driving speed for both bands, the outer band will be retarded relative to the inner band by a distance which is equal to the product of the radial differential, that is, the radial thickness of the cakes between the two bands times the angle of envelopment. This retarding of the outer filter band causes displacement or deformations within the cakes. As a result there is a change in the consistency of the cakes, and particularly a loosening thereof, so that liquid can be more readily driven out of the cakes. Moreover, the already described reversal of the direction of stresses due to the opposite rotational directions materially increases the dewatering effect.

It is also within the concept of the invention that the pressure of the planet rolls, both for individual rolls and for group thereof, can be controlled. Such control can be effected in a particularly simple manner by means of a tension member such as a rope. This tension member is in contact with lever arms provided according to the invention, which in turn are linked to a stand or frame structure for the drums or to another suitable support.

The rope or other tensioning member which is tensioned along the circumferential outline of the dewatering drums may coact for example with adjustable noses or dogs on the lever arms or other pivotal elements can be used. By tensioning of the rope the component of force composed of the force of the rope in a direction normal to the lever arms is enlarged. As a result, the pressure exerted by the planet roll or rolls toward the respective dewatering drum and thus the filter bands increases corresponding to the effective length of each lever arm between its pivot point or the setting of the nose or dog.

According to still another aspect of the invention, the pressure or planet rolls which are preferably staggered relative to each other in the driving direction of the filter bands, can be increased by several pressure plates overlying the rolls and also made more uniform. Such pressure plates can be provided on both sides of the filter bands which are disposed substantially parallel to each other within the preliminary pressure zones, and if desirable, the pressure plates are so mounted that they can be jointly pressed toward the bands whereby additonal control of the effective pressure exerted by the rolls is obtained.

Advantageously, the pressure rolls can also be in the form of parts of continuously rotating pressure bands, etc. These parts may be coupled by chain links. In actual practice, it depends on the specific conditions under which a particular device is operated whether the pressure bands are directly driven or driven indirectly by being placed in driving contact with the filter bands.

It is also possible to arrange pressure bands or similar members so that they in turn will drive the filter bands without special drive for the filter bands. The control of the bands can be effected in an efficient manner by means of deflection rolls, or as it is described in the present invention, by means of the dewatering drums.

According to a parcicularly favorable embodiment of the device according to the invention, one of the filter bands is extended to the location of a feed chute or hopper. and it extends from the point of feed about horizontally to a deflection roll. This distance between the feed point and the deflection roll may be utilized as a straining or pre-dewatering zone. After passing the deflection roll, the aforementioned extended filter band now jointly with the second filter band which is only in tangential relationship with the deflection roll, is thus moving in opposition to its initial direction of movement through the preliminary pressure zones. At the end of the movement in this opposite direction, both filter bands are jointly guided upon the first one of the dewatering drums. This drum is enveloped by the two filter bands with an envelopment angle which according to the invention is between 220° to 240°.

After having passed about the first dewatering drum, the two filter bands are guided to a further dewatering drum which is disposed side-by-side and approximately horizontally to the first drum. The envelopment angle of the filter bands about the second drum is preferably larger than the envelopment angle for the first drum.

After leaving the second dewatering drum, or if there are more than two drums after leaving the last drum, the now fully processed or worked sludge cake is discharged and each filter band is separately guided back to the straining and/or preliminary pressure zone. While moving toward these zones, the filter bands are preferably guided into contact with at least some of the pressure rolls on the sides thereof distant from the respective drum thus increasing the effective pressure exerted by these rolls.

A dewatering device according to the invention with two dewatering drums having a drum diameter of 1 meter provide about 16 meters of active band length and the total length of the device is not more than 2.5 meters. The thus obtained space utilization ration is more than 70%, and this is very much in excess over the utilization ration as can be obtained with dewatering devices as heretofore known.

BRIEF DESCRIPTION OF THE DRAWING

In the accompanying drawing, several embodiments of the invention are shown by way of illustration and not by way of limitation.

In the drawing:

FIG. 1 is a diagrammatic elevational section of a dewatering device according to the invention including two substantially side-by-side disposed dewatering drums;

FIG. 2 is a detail view of FIG. 1 on an enlarged scale;

FIG. 4 is an elevational sectional view of a modification of a dewatering device according to the invention;

DETAILED DESCRIPTION OF THE DRAWING

Figure 3:
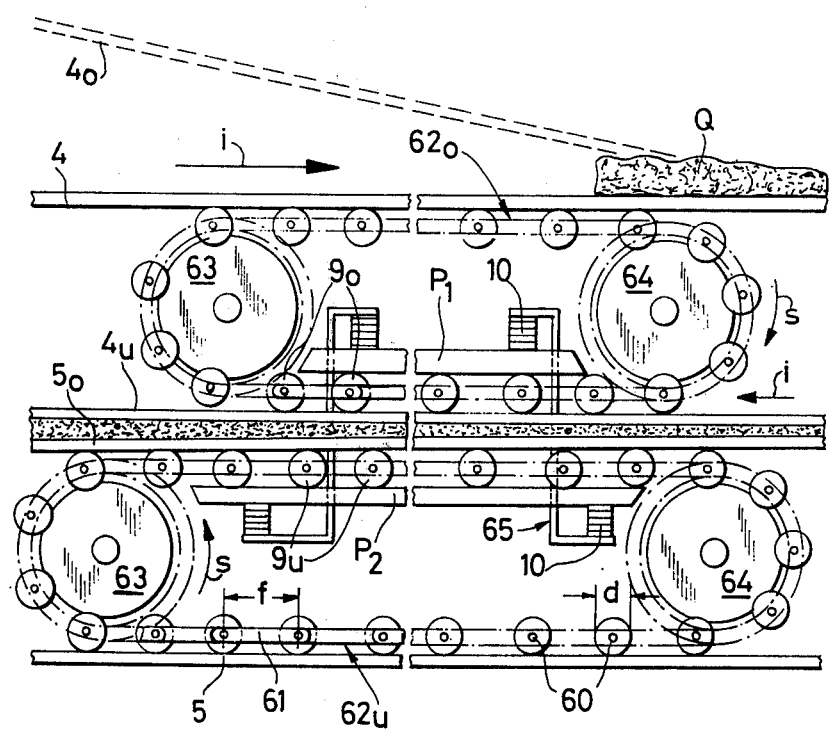
FIG. 3 is a view of a modified detail of the device according to FIG. 1 on an enlarged scale.

Referring now to the figures in greater detail, and first to FIG. 1, this figure shows an exemplification of a dewatering device R which includes two large dewatering drums 1 and 2. Two filter bands 4 and 5 which are disposed for part of their length in parallel spaced apart relationship, envelop the two drums for part of the circumferential walls therof. More specifically, the envelopment angle for drum 1 is $m$ (for instance 235°), and $n$ (for instance 285°), whereby the two filter bands approximately define an upright S-shape.

A cake Q formed of sludge to be processed is fed in the direction $t$ upon first filter band 4 in the conveying direction $i$. This band guides the cakes Q by means of support rolls 6 through straining zone $D_1$ to effect preliminary dewatering of the cakes. Water extracted from the cakes is removed through the mesh openings or holes in the pulling side $4_o$ of band 4 and drops into a catch trough 7.

Each preliminarily dewatered cake Q falls at a deflection roll 8 for filter band 4 upon the pulling side $5_o$ of filter band 5 which is disposed approximately tangentially with respect to the lower side of deflection roll 8. As a result, the cakes are successively turned around and also mixed. Between the idling side $4_u$ of the first filter band 4 and the pulling side $5_o$ of the second filter band 5 the sludge cakes are guided through a preliminary press zone $D_3$. In this zone pressure rolls 9 which are disposed staggered on both sides of filter band sides $4_u$ and $5_o$ process the sludge cakes. Both rows of pressure rolls 9 are via pressure plates P pressed against each band side $4_u$ and $5_o$ by means of power sources 10 coacting with pressure plates P.

The deformation such as bends introduced by pressure rolls 9 in the filter bands are ignored in the drawing to simplify the illustration.

After leaving the preliminary pressure zone $D_3$ the two filter bands 4 and 5 with sludge cakes Q therebetween are guided upon the circumferential wall of dewatering drum 1 in the rotational direction $i$, within the range of the envelopment angle $m$. This angle controls the effective length of the main pressure zone $D_5$ in which the filter bands 4 and 5 are guided between the circumferential wall 11 of the drum on one hand and planet rolls 40 disposed in juxtaposition to the outer side of the circumferential wall of the drum.

The drum wall 11 consists either of grooved or perforated metal sheets such as steel sheets, or according to FIG. 2, out of tubes 41 which are disposed parallel to the rotational axis of the drum. The filtrate which is pressed out of cakes flows between the tubes into the interior J of the drum. The tubes 41 are bored at their ends (not shown) so that any filtrate accumulating in the lower part of the space U within the drum flows first into the space within the tubes and can then be removed from the tubes at the ends thereof.

The planet or pressure rolls 40 are biased by the action of power supplies 42 toward the outside wall 11 of the drum. Such bias may be obtained either for each one of the planet rolls 40 or for groups of these rolls. Each roll 40 is pivotally supported by means of a link 44 hinged to a pivot 46 as it is schematically indicated by supports 45 or similar means. These pivotal links 44 mount dogs or noses 47 for placing thereupon a pull rope 49. The pulling force exerted by this rope can be adjusted by the power supply 42 shown as a rotary pulley.

The aforedescribed pressure means (42 to 48) permit by utilization of the leverage to effect individual regulation of the pressure for each one of the planet rolls. By tensioning rope 48 the component of force as produced by the rope pull in a direction normal to the pivotal link 44 is increasd, whereas the pressure of the planet roll 40 toward drum wall 11 varies the respective lever arm between the pivot point 46 of link 44 and the respective nose for supporting the pull rope 48.

The pressure of the planet rolls toward the respective drum wall is further enlarged by the tension of the returning filter band portions $4_e$ and $5_e$ within each range C in which the planet rolls 40 in toto or individual planet rolls $40_z$ are utilized for effecting the deflecting of the filter bands. The point at which the filter bands 4 and 5 leave drum 1 and thus the pressure zone $D_5$ is controlled by the lower leg of the envelopment angle $m$.

At this stage of processing each sludge cake Q which was bent to a curvature somewhat less than corresponding to the radius $r$ of dewatering drum 1, is suddenly flattened between filter bands 4, 5. As a result, the previously inner parts of the cake are stretched and the previously outside lying cake parts are pushed together whereby the structural consistency of the cake is correspondingly loosened and prepared for further pressing operations.

As is now apparent, the action upon the sludge cakes is similar to the one to which the cakes have been subjected in the straining zone $D_1$ and the preliminary pressure zone $D_3$ due to the action of the gravitational force.

When the outer wall surface 11 of the second dewatering drum 2 is reached at the end of the comparatively pressure-free zone F the sludge cakes Q which are now loosened as described are again bent but now in the opposite direction $i_3$. As a result, the effect due to the simultaneous action of the pressure due to the tension of the filter bands and due to the first planet rolls $40_a$, is further considerably increased. Due to such preparation, it is possible to extract from the sludge cakes, which have now a totally different structural consistency, considerable quantities of liquid as they are guided about the dewatering drum 2. Such further extraction of water would not be possible without the aforedescribed relocation of the sludge particles forming the cake. The continuous shear action as it is obtained by the more rapidly moving inner filter band 4 further substantially assists the dewatering operation.

The dewatering drums 1 and 2 can be driven with synchronous speed or with at least a minimum differential of circumferential speed. For this purpose, a power drive with gearings which have different transmission ratios as herinafter described can be used.

Filter bands 4, 5, after leaving dewatering drum 2 and the range of rolls $40_z$ together with the dewatered sludge cakes now designated by O are guided over a diverter roll 50 common to both filter bands to small individual rolls 52. The roll 50 is disposed at the apex of an imaginary triangle. This triangle is defined by a line L which extends through the axes of the drums, as it is shown in FIG. 1 and legs defining an angle $v$ of about 35°. The roll 50 is associated with planet rolls 51: in addition, some of the planet rolls 40 associated with the adjacent dewatering drum 1 touch part of the filter band sides $4_e$ and $5_e$.

The two individual rolls 52 are mounted spaced apart from each other and define a discharge gap 53 between filter bands 4, 5 for ejecting dewatered sludge cakes O. The return or pulling band portions $4_e$ and $5_e$ respectively, extend from discharge gap 53 first over the planet rolls 40 (range C), then via the upper deflector rolls 55, back to the straining zone $D_1$ and to the preliminary pressure zones $D_3$, respectively. Band flushing means 56 are interposed between the deflector rolls 55 and zones $D_1$ and $D_3$.

FIG. 3 shows another exemplification of the preliminary pressure zones $D_3$. According to this exemplification, pressure rolls $9_u$ are disposed underneath band sides $4_u$ and $5_o$ and also rolls $9_o$ over which via roller bearings 60, engaged by chain links 61 are joined to form endless pulling band portions $62_o$ and $62_u$ in the direction of arrow S. Accordingly, a structure is formed which is similar to the flexible cage of, for instance, a needle bearing.

Driving of each pressure roll 9 is effected by frictional driving of filter bands 4, 5. The pressure rolls 9 are pressed within the pressure zones $D_3$ upon the inner side of filter bands 4 and 5. Diametrically opposite to pressure rolls 9 there is disposed a pressure plate $P_1$ and $P_2$, respectively. When now the chain links 61 are guided over the spocket teeth 63, 64 in the driving direction $i$ of the filter bands 4 and 5, the pressure rolls 9 are rolling off on the stationary pressure plates P.

The rotational speed on the opposite side is now twice as high as the running speed of the chains formed by links 61. This has the advantage that by means of relatively thin-walled and light pressure rolls 9, high pressures can be transmitted. This is due to the fact there is no strain due to the absence of bending forces normal to the axis of the rolls. The bending forces are compensated by pressure plates P overlying the rolls.

The pressure plates P are spring tensioned at 65 so that no forces need to be transmitted by an external support structure.

In particular, if the bands are fairly light, the sprockets 63, 64 for the chain links can be driven and then in turn drive the filter bands 4 and 5 in the direction $i$ via the pulling band sides 62, that is, the drive of filter bands 4 and 5 is effected no longer by one of the deflection rolls 8, $5_o$, 55 or the dewatering drums 1 and 2 which would cause heavy strains within the range of the transmission of force upon the respective filter band 4 or 5, which must be pulled by a multitude of gaps between rolls. Instead of this transmission of force there is obtained at each of the gaps between the rolls a transmission of force corresponding to the prevailing pressure, and this transmission of force is uniformly distributed over a large surface.

By selecting different diameters $d$ and at axial spacings $f$ for the upper and lower pressure rollers 9 substantially more or less pronounced sine-shaped deflectors can be obtained at the surfaces of the filter bands between which sludge cakes Q are placed. Moreover, a relative movement can be superimposed by differential speeds of the upper and lower pulling sides $62_o$ and $62_u$ of the bands.

According to the exemplification shown in FIG. 4, the device $R_1$ does not include the straining zone $D_1$, but the sludge cakes Q drop immediately into preliminary pressure zones $D_3$ which is disposed below dewatering drums 1 and 2. Pressure rolls 9 are loaded by means of pressure plates P. These plates in turn are swingingly supported on catch trough 7.

The sludge cakes Q are guided from the preliminary pressure zone $D_3$ to the first one of the dewatering drums. After leaving this drum, cakes Q are gudided through pressure zone $D_5$ and subsequently to pressure zone $D_7$. After having passed through the last-mentioned zone, filter band 4 guides the now dewatered cake O to deflection roll 90 which is continued by a discharge chute 91. Filter band 4 after having been guided over roll 90 passes through cleaning zone 56 and a subsequent catch trough 93. This catch trough is formed by two rolls 92 on band 4 itself. Finally, band 4 is guided by deflection rolls 55 and 8 back to preliminary pressure zone $D_3$.

The second filter band 5 is guided over and between the dewatering drums 1 and 2 by the lower band 4 and it is also lifted by this band above the drums and either immediately at planet rolls 40 or over further deflection rolls and cleaning station 56 back to preliminary pressure zone $D_3$. Cleaning statiion 56 includes discharge elements 94 which accumulate the cleaning water and discharge the same via pipes 95.

If it is desired to effect preliminary dewatering also with the exemplification $R_1$, filters may be provided ahead of the feed-in points (not shown).

Figures 5, 5A:
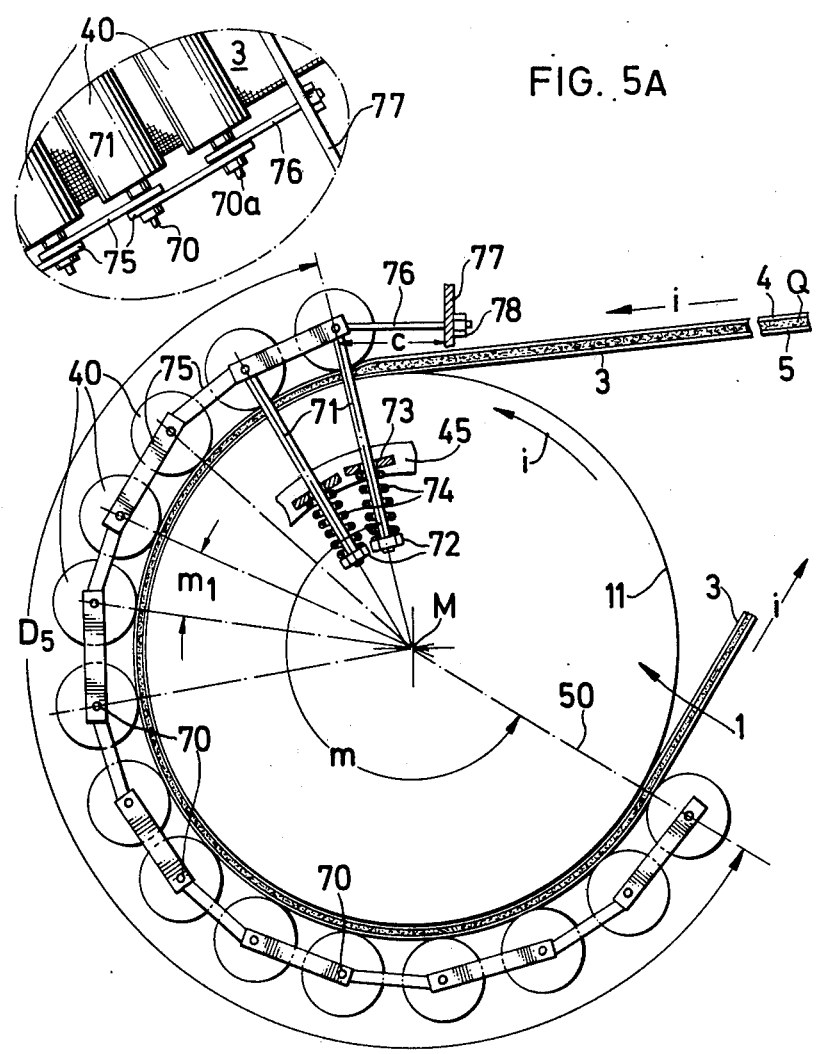
FIG. 5 is a detail view of FIG. 4 on an enlarged scale.
FIG. 5A is a detail view of FIG. 5 on a further increased scale.

Referring now to FIG. 5, according to this figure a further belt 3 formed by filter bands 4 and 5 is guided over dewatering drum 1 in the driving direction $i$. Sludge cakes Q are again placed between the filter bands. The two filter bands 4 and 5 are passed about the circumferential wall surface 11 of drum 1 within an enveloping angle $m$ of about 235°, said angle being the sum total of the so-called roller angles $m_1$. The filter bands leave dewatering drum 1 which rotates in the direction $i_1$ at the lower branch 50 of enveloping angle $m$.

A plurality of planet rolls 40 press the outer or upper filter band 4 toward the circumferential surface wall of drum 1 within pressure zones $D_5$ which in turn is controlled by the envelopment angle $m$.

The axle 70 of each planet or pressure roll 40 is journalled at both ends by radially disposed bars 71. The end of these bars which faces the drum shaft F mounts a lock nut 72. A coil spring 74 which is positioned to expand in radial direction is disposed between nut 72 and abutment plates 73 which in turn are supported by diagrammatically indicated drum holders 45. Each of these springs biases the respective pressure roll 40 toward the circumferential wall 11 of the drum.

The axles 70 of the rolls are staggered in circumferential direction by pull links 75. The axle $70_a$ which is the first one in the driving direction $i$ is suspended by means of radially disposed guide bars 76 on a cross bar 77 on the drum support 45.

The effective length $c$ of the guide parts 76 can be adjusted by setting an adjustment nut 78. Similarly, the effective length of radially disposed bars 71 can be adjusted by means of nuts 72.

A dewatering device as exemplified, that is, a device which includes two dewatering drums 1 and 2, provides that with a drum diameter of 1 meter about 16 meters of effective filter band length are available. Yet the total lenth of the device is not more than 2.5 meters. The resulting utilization of the filter bands is more than 70%, and such high efficiency factor is far above the efficiency factor of any dewatering device of the kind herein-referred to as now known.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A method of dewatering sludge, said method comprising the steps of:
   feeding successive quantities of sludge in cake form through a preliminary dewatering zone in the form of a moving filter band;
   then feeding the partially dewatered cakes through a preliminary pressure zone in the form of two spaced apart relatively moving filter bands by guiding the cakes between said two bands and causing the bands to exert pressure upon the cakes while moving along and between bands;

then guiding the two filer bands with the cakes therebetween about part of the periphery of a rotary first main dewatering pressure zone and applying pressure to the outer one of said bands and thus to the cakes while being guided by and on said first main pressure zone;

then guiding the two filter bands with the cakes therebetween from said first main pressure zone to and partly over the periphery of a rotary second main dewatering pressure zone and applying pressure to the filter bands and thus to the cakes therebetween while rotating the second main pressure zone in opposition to the first main pressure zone and so as to reverse the inner and outer portions of the filter bands relative to the main pressure zones;

subjecting the filter bands while being guided through the preliminary pressure zone and the two main pressure zones to the action of vibration generating pressure means causing vibrations of the filter bands and thus of sludge cakes therebetween; and then discharging the cakes from the second main pressure zone.

2. The method according to claim 1 wherein said two main pressure zones are in the form of rotary dewatering drums, and comprising the further step of guiding said two parallel filter bands about said drums so as to form the shape of the letter S.

3. The method according to claim 1 and comprising the further step of applying pressure upon the outer one of said parallel filter bands while being guided upon the peripheries of the drums of said main pressure zones.

4. The method according to claim 2 wherein said parallel filter bands are substantially linearly guided prior to being guided to the main pressure zones.

5. The method according to claim 1 and further comprising the step of filter bands guiding the sludge cakes therebetween along a substantially straight path when and while moving from said first main pressure zone to the second main pressure zone.

6. The method according to claim 1 and further comprising the steps of subjecting the sludge cakes while passing through said main pressure zones to repetitive pressure and shear forces by reversing the direction of said forces when and while the sludge cakes are passing between said main pressure zones.

7. The method according to claim 1 wherein the pressure to which the sludge cakes are subjected is varied when and while the cakes are passing through said preliminary and main pressure zones.

8. The method according to claim 1 and further comprising the steps of subjecting the sludge cakes while being guided by said parallel filter bands and passing said main pressure zones to the action of the gravitational force and turning the cakes upside down for changing the structural consistency of the sludge cakes.

* * * * *